United States Patent [19]

Eilenstein-Wiegmann et al.

[11] Patent Number: 5,346,161
[45] Date of Patent: Sep. 13, 1994

[54] APPARATUS FOR GUIDING A LOAD, ESPECIALLY ON THE LOADING FLOOR OF AN AIRCRAFT

[75] Inventors: Wilfried Eilenstein-Wiegmann, Stuhr; Guenter Vogg, Bremen, both of Fed. Rep. of Germany

[73] Assignee: Deutsche Aerospace Airbus GmbH, Hamburg, Fed. Rep. of Germany

[21] Appl. No.: 39,812

[22] Filed: Mar. 29, 1993

[30] Foreign Application Priority Data

Mar. 28, 1992 [DE] Fed. Rep. of Germany ....... 4210191

[51] Int. Cl.⁵ .............................................. B64D 9/00
[52] U.S. Cl. .................. 244/137.1; 193/35 C; 414/536; 410/82
[58] Field of Search ................ 244/118.1, 137.1, 137.3; 198/782, 785, 836.3, 836.4; 193/35.55, 35 C; 414/531–536; 410/52, 69, 70, 71, 77–79, 81, 82, 86–90, 92, 94, 107, 111, 117

[56] References Cited

U.S. PATENT DOCUMENTS

| | | | |
|---|---|---|---|
| 3,741,504 | 6/1973 | Alberti et al. .................... | 244/118.1 |
| 3,830,385 | 8/1974 | Young .................................. | 414/536 |
| 3,906,870 | 9/1975 | Alberti .............................. | 244/137.1 |
| 3,927,622 | 12/1975 | Voight .............................. | 244/137.3 |
| 4,395,172 | 7/1983 | Hoener et al. ..................... | 244/118.1 |
| 4,993,899 | 2/1991 | Engel et al. ....................... | 244/118.1 |
| 5,090,638 | 2/1992 | Eilenstein-Wiegmanns .... | 244/118.1 |
| 5,098,038 | 3/1992 | Hruska et al. ..................... | 244/118.1 |

Primary Examiner—Galen L. Barefoot
Attorney, Agent, or Firm—W. G. Fasse; W. F. Fasse

[57] ABSTRACT

Loads, such as pallets or freight containers, are guided and restrained on the loading floor of an aircraft by a device which provides guide rollers oriented in the direction of the longitudinal axis of the aircraft to hold pieces of freight in the horizontal direction. Additionally, cantilevered latching members hold a piece of freight against vertical and/or tilting movements. Both, the guide elements and the latching members are mounted to be tilted into the floor structure. The latching members perform simultaneously a rotating movement and a tilting movement when the device is moved or tilted into its recessed position below a top surface of the loading floor.

12 Claims, 5 Drawing Sheets

APPARATUS FOR GUIDING A LOAD, ESPECIALLY ON THE LOADING FLOOR OF AN AIRCRAFT

FIELD OF THE INVENTION

The invention relates to an apparatus for guiding and latching a load, e.g. a pallet or freight container on the floor in the cargo hold of an aircraft. For this purpose, the apparatus is equipped with a lateral guide element for holding a load on track.

BACKGROUND INFORMATION

For efficiently using the available space in the cargo hold of an aircraft, it is necessary that each piece of freight is brought into a defined position during the loading operation. For this purpose, it is necessary that the loads are properly aligned by corresponding guide elements so that when a piece of load is displaced, the required orientation is maintained, and a canting or rotation of the piece of freight is positively prevented.

It is possible to use guide rails arranged on the loading floor of the aircraft. These guide rails extend substantially in parallel to the movement direction of a piece of freight. Arranging such guide rails in a stationary position on the loading floor had its difficulties heretofore because such rails constitute a hindrance to the intended displacement of the loads in the direction of the longitudinal aircraft axis. Such a displacement or shifting of the freight pieces, however, is useful in order to make an optimal, efficient use of the available loading space. Conventional guide rails are also deficient with regard to providing an adequate guiding of pallets, because these conventional devices do not limit the movement of a pallet in a direction of the yawing axis of the aircraft, namely upwardly e.g. by tilting.

OBJECTS OF THE INVENTION

In view of the foregoing it is the aim of the invention to achieve the following objects singly or in combination:

to construct a guide apparatus of the type described above in such a way that it permits limiting the movement of a load in the direction of the yawing axis while permitting the positioning of the guide element in such a way that a piece of freight can be properly moved in the longitudinal or rolling axis of the aircraft without hindrance;

to guide a piece of freight in such a way that its canting or rotation is prevented; and to provide a self-locking feature with a toggle lever in such a guide element.

SUMMARY OF THE INVENTION

The guide apparatus according to the invention is characterized in that a guide element is mounted on a carrier which is connectable by a hinge or pivot joint with a floor structure of the aircraft. A latching member is arranged to guide the load and to restrain the load vertically by reaching over an edge of the pallet or freight container. The tiltably mounted carrier is tiltable by a toggle lever, one end of which is connected to the carrier and the other end is connected to a fixed point on the floor or in the floor.

Due to the tiltable mounting of the carrier, it is possible to tilt the guide element into the floor structure, whereby a piece of freight may simply roll over the load guiding apparatus.

The present apparatus is relatively flat so that it is well suited to be recessed into the space available in the loading floor which is normally limited to a vertical depth of two inches.

The use of the toggle lever for the present locking and guiding device has the advantage that it assures a simple operation while simultaneously providing a self-locking feature when the locking elements are tilted upwardly into an operating position in which the legs of the toggle lever are so positioned relative to one another that the above mentioned self-locking is obtained without requiring any additional arresting elements.

The pallets or freight containers are locked in the vertical direction by a latching member connected to or forming part of the guide elements. The latching members reach over an edge of the respective freight piece, thereby preventing a lifting of a freight piece off the floor. This feature simultaneously prevents any tilting motions, for example, of a pallet even if the latter should be loaded nonuniformly.

By securing the pivot joint or hinge of the latching member and the fixed point for the mounting of the toggle lever to a mounting frame or adapter, the present device can be efficiently installed on existing freight floors with few man hours, simply by attaching the mounting frame or adapter to the rail structure conventionally present in the loading floor.

It has been found that an unintended tilting of the guide element with its latching members is prevented without additional arresting means if the toggle lever assumes an angle within the range of about 30° to about 60° relative to the level of the loading floor when the toggle lever is in its extended straightened out position, whereby the floor mounted end of the toggle lever bears against a fixed point, preferably a position adjustable fixed point.

A sure latching of a piece of freight in the vertical direction and the proper positioning of the latching members relative to the guide elements is made possible by providing the latching members with a guide finger extending substantially perpendicularly to the lateral guide surface of the guide elements. Preferably the latching or guide finger is mounted for tilting about a rotational axis that itself is journalled for movement into the floor. This feature facilitates the recessing of the guide elements and the latching members into a space below the upper plane of the loading floor.

Preferably, the tilting motion of the guide elements is linked to the journalling or tilting of the latching members by a cam and cam follower so arranged that a tilting motion of the guide element is automatically converted into a tilting drive for the latching member and so that upon arrival of both the guide elements and the latching member in the recessed position both are fully recessed below the upper floor plane or level.

Such a cam and cam follower control or drive is simply realized in that the latching member is provided with a curved surface and in that the adapter or mounting frame is provided with a cam follower that is engaged by the cam surface of the latching member when the guide element is tilted into the recessed position.

The positioning of a piece of freight is facilitated by providing guide rollers in the floor structure which project slightly above the surface of the loading floor and of the guide elements in their recessed position, whereby the load can roll along these projecting guide rollers. These projecting guide rollers may take the form of support balls or carrier balls or these guide rollers are combined with carrier balls.

In order to facilitate the operation of a plurality of the present guide elements simultaneously, such guide elements are interconnected between tilting units which are hinged to the rail system of the loading floor. Interlocking devices connect the tilting units to the respective guide elements, or rather to a cross-connector carrying respective guide elements.

The return of the present tilting units and of the guide elements into the operative upright position out of the recessed position is faciliated by providing a reset spring either between the tilting units or the guide element on the one hand, and the mounting frame on the other hand. The reset spring tends to overcome gravity, thereby simplifying the return of the guide elements and tilting units into the upright operative position.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
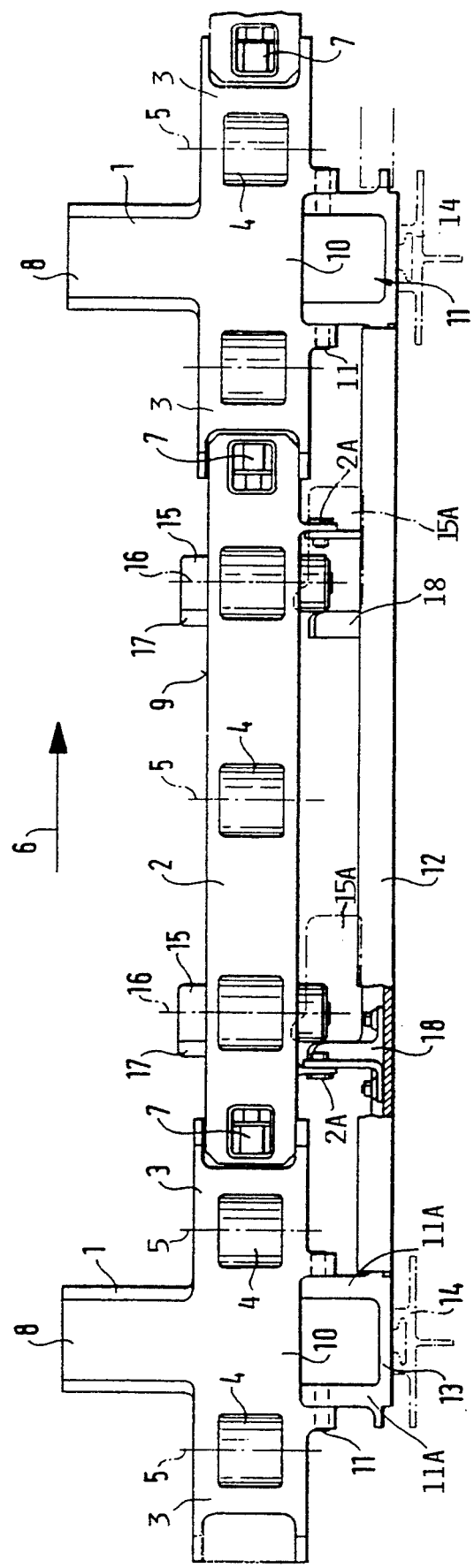
FIG. 1 is a side view of the present apparatus in the direction of the arrow I in FIG. 3, whereby the view direction extends in parallel to the loading floor.
Figure 2:
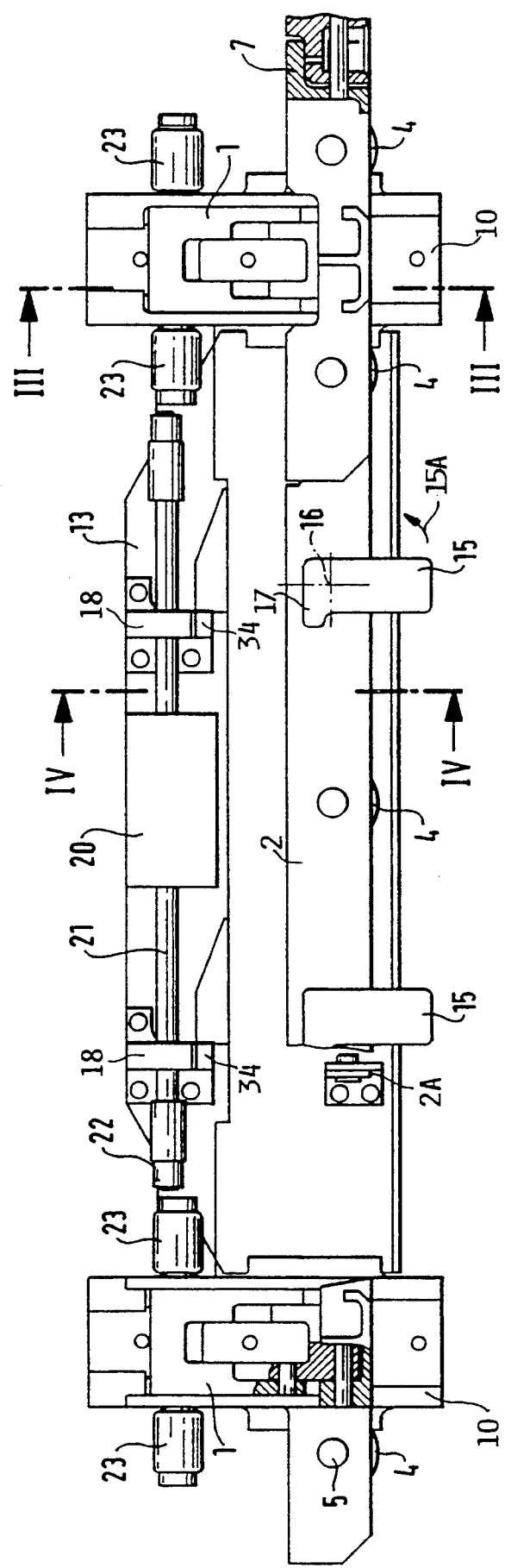
FIG. 2 is a top plan view of the apparatus of FIG. 1 as viewed in the direction of the arrow II in FIG. 3.

Referring to FIGS. 1 and 2, the present apparatus includes a plurality of first guide elements 1 forming tilting units and a plurality of second guide elements 2 connected with the tilting units by interlocking devices 7. The first guide elements 1 have side arms 3 carrying guide rollers 4 rotatable about vertical axes 5 when the guide elements 1 are in the upright operative position. The second guide elements 2 also carry guide rollers 4 rotatable about their respective axes 5. The axes 5 in their vertical operative position also extend perpendicularly to the travel direction 6 of a piece of freight, such as a pallet 24 shown in FIGS. 3, 4, and 5. The first guide elements 1 have normally upwardly and vertically extending operating extensions 8 as shown in FIG. 3, when the guide elements 1 are in the upright position.

The operating extensions 8 reach above an upper surface 9 of the second guide elements 2.

Figure 3:
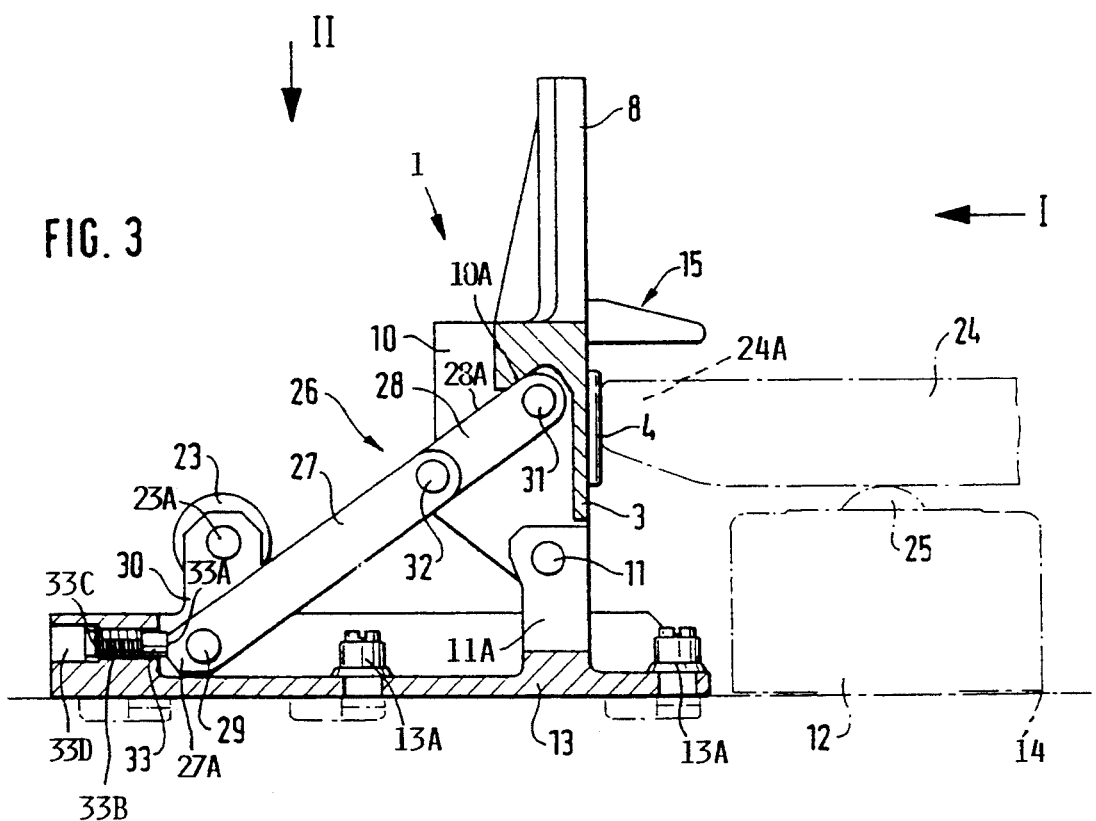
FIG. 3 is a sectional view along section line III—III in FIG. 2.

Referring to FIGS. 1 and 3, the guide elements 1 comprise a mounting body 10 hinged by a journal pin 11 to a mounting bracket 11A forming part of a mounting shoe 13 which is secured to support rails 14 forming part of the loading floor structure 12. For example, screws 13A are used to directly secure the mounting shoe 13 to the rails 14.

Figure 4:
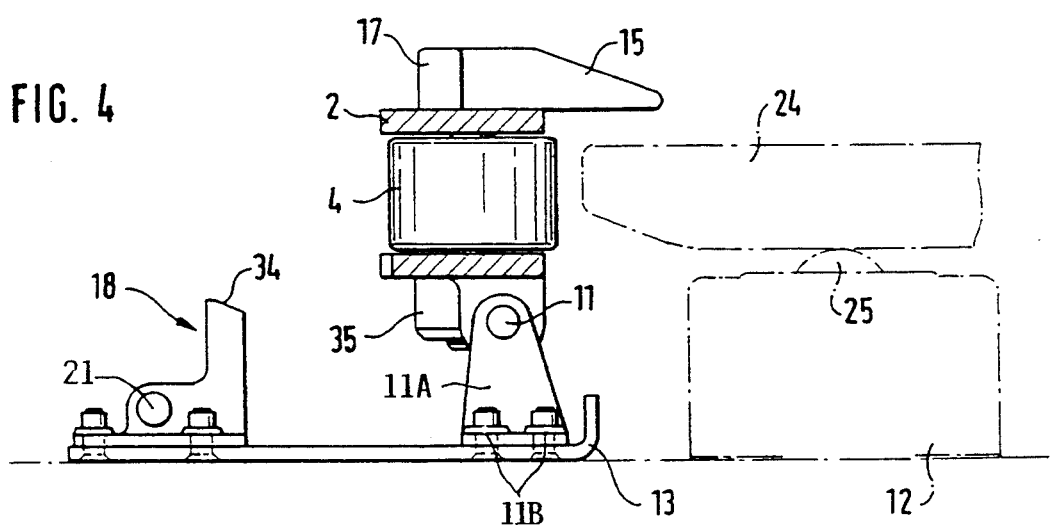
FIG. 4 is a sectional view along section line IV—IV in FIG. 2.
Figure 7:
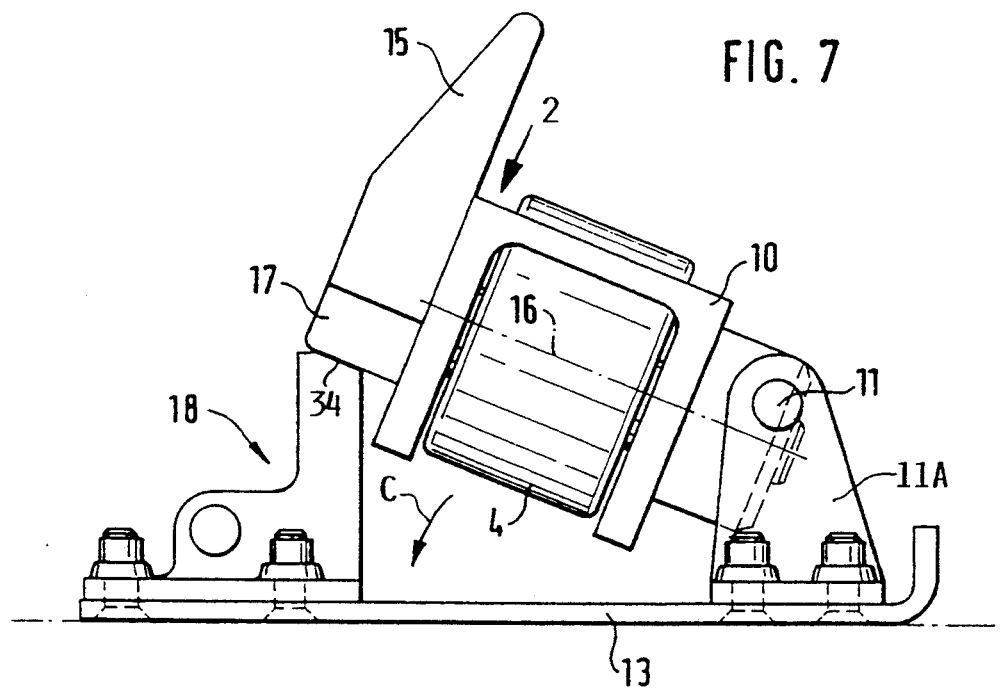
FIG. 7 illustrates the tilting of the guide element and of the latching member into the recessed position, whereby the rotation of the latching member about a tiltable rotational axis is about to begin for rotating and tilting the latching member into the recessed position.
Figure 8:
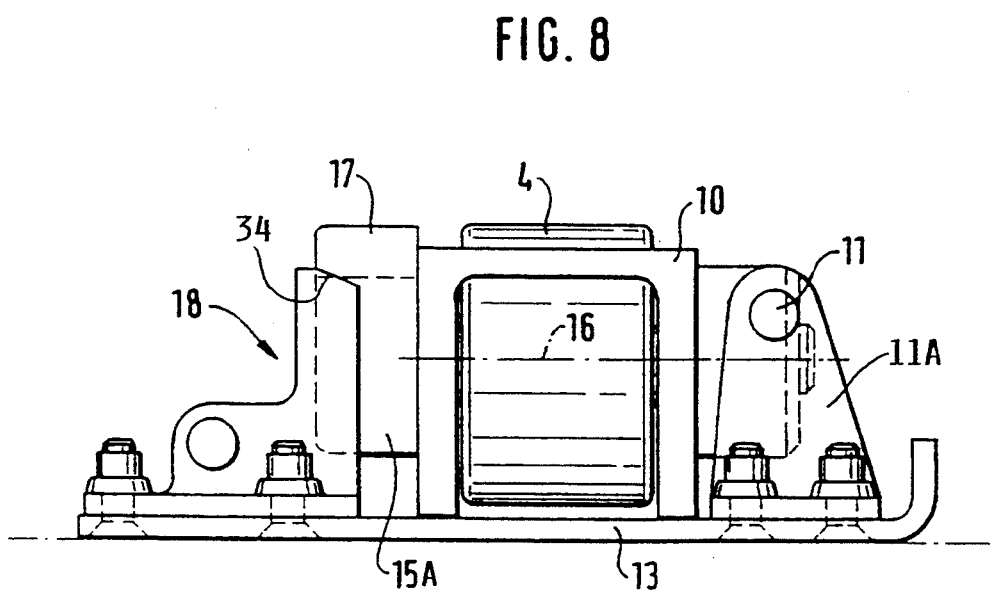
FIG. 8 is a view in the same direction as FIG. 7, however, illustrating the fully recessed position of the guide element and of the latching member.

Referring to FIGS. 1 and 4 in conjunction, the second guide elements 2 carry latching members 15 which are mounted to be rotatable about an axis 16 also shown in FIGS. 7 and 8. The rotating movement of the latching members 15 covers, for example, a range of about 90° to bring the latching members 15 into a recessed position as shown in FIG. 8 to be described in more detail below. For the purpose of assuring an automatic rotating motion of the latching members 15 these members are provided with a cam surface 17 that cooperates with a cam surface 34 of a cam 18 secured to the loading floor structure 12. When the first guide elements 1 are tilted into the recessed position about the journal pins 11, they entrain the second guide elements 2, whereby the cam surfaces 17 and 34 cooperate with each other in turning the respective latching member 15 about its rotational axis 16 to move the latching members 15 into the recessed position shown in FIG. 8. A dash-dotted line 15A in FIG. 1 illustrates the recessed position of the latching members 15. Rotating and tilting take place simultaneously.

Referring again to FIG. 2, the tilting of the first guide elements 1, and thus also of the second guide elements 2 due to the connection by the interlocking device 7, takes place with the aid of a drive 20 which may, for example, be a motor or a lever. The drive 20 drives a drive shaft 21 which engages the respective first guide elements 1 through a clutch 22 to provide a form or force locking coupling between the drive shaft 21 and the respective guide element 1 to bring the present device into the position shown in FIG. 5 below the top surface of the loading floor 12.

Figure 5:
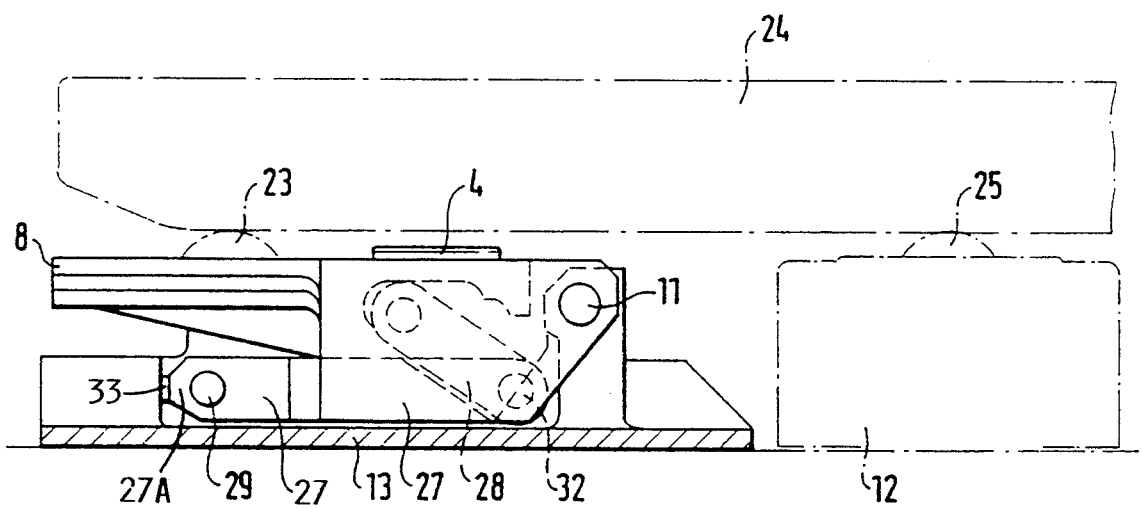
FIG. 5 is a view similar to that of FIG. 3, however, showing the present apparatus in its recessed position in the loading floor.

Referring to FIG. 3, guide rollers 23 are mounted to the mounting shoe 13 in such a way that the top plane defined by the rollers 23 extends slightly above the loading surface of the floor 12 as shown in FIG. 5 to permit the rolling of a pallet 24 on the rollers 23 prior to latching the pallet 24 in a loaded position. Thus, these rollers 23 which cooperate with roller balls 25 also shown in FIG. 5, facilitate the movement of a freight piece into its loading position and also its movement out of the aircraft at the time of unloading. Rollers 23 have horizontal axles 23A.

As shown in FIG. 3, which shows the guide elements 1 and 2 in their upright, operative position, the latching members 15 extend horizontally above an edge 24A of a pallet 24 thereby restraining movement of the pallet upwardly. Thus, the pallet is prevented from tilting. Simultaneously, the edge 24A is horizontally restrained by the guide rollers 4. The above mentioned support or bearing balls 25 support the pallet 24 also in its loaded condition when the pallet is restrained horizontally and vertically as just described. According to the invention the upright position of the guide elements 1 and 2 is secured by a toggle lever arrangement 26 comprising a foot section 27 and a head section 28 journalled to each other by a pivot joint 32. The upper end of the head section 28 is journalled to the mounting body 10 in a recess in such a way that a shoulder 10A bears against the upper edge 28A of the head section 28A of the toggle lever, thereby preventing that the toggle lever 26 can buckle upwardly, but permitting the buckling of the toggle lever 26 downwardly to permit folding the guide elements into their recessed position inside the loading floor. The foot section 27 of the toggle lever 26 is journalled to the mounting shoe 13 by a pivot joint 29. The lower end 27A of the foot section 27 is so shaped that it bears against a fixed point 30, preferably an adjustable fixed point 33 as shown at 33A. The adjustable fixed point 33 is a threaded bolt received in a threading 33B having a head 33C accessible by an adjustment tool through an opening 33D. The stop provided at 33A also prevents an upward buckling, but permits a downward buckling for the folding of the apparatus. The foot section 27 of the toggle lever 36 is longer than the head section 28, whereby the downward buckling of the toggle lever 26 is facilitated.

Referring again to FIG. 4 in conjunction with FIGS. 7 and 8, the cam 18, which is secured to the mounting shoe 13, is so positioned with its cam surface 34 that the cam surface 17 of the latching member 15 will be engaged by the cam surface 34 as the guide element 2 is tilted counterclockwise around the journal pin 11 as indicated by the arrow C in FIG. 7. This engagement causes the rotation of the latching member 15 about the axis 16 into the plane of the drawing of FIG. 7 so that in the recessed position 15A the latching member 15 is partly positioned behind the cam 18 as shown in FIG. 8. The tilting is accomplished through the drive 20 and the drive shaft 21 as described above. In order to facilitate the clockwise return of the elements 1 and 2, into the upright operating position shown in FIG. 4, there is provided a biasing spring 35 which bears against the mounting shoe 13 in the recessed position of the apparatus. This spring 35 operates so as to bias the toggle lever 26 in its buckled, recessed position upwardly so that it has a tendency to assume the position shown in FIG. 3. Thus, the spring 35 facilitates the lifting of the apparatus into the position of FIGS. 3 or 4.

The first guide element 1 with its side arms 3 is preferably provided with a foot plate 36 which may be a uniform single piece construction with the sidearms 3 and other components of the guide element 1 forming the above mentioned tilting unit.

In the fully recessed position shown in FIG. 5, the pallet 24 is free to move supported by the support balls 25 and guided by the guide rollers 23. The lower section 27 of the toggle lever 26 now extends horizontally while the upper section 28 extends at an angle to the bottom of the floor 12 as shown by dashed lines in FIG. 5. The end 27A still bears against the adjustable stop 33. The end 27A of the lower lever section 27 is so shaped that a certain resistance must be overcome when the lever section 27 moves from one position into the other.

Figure 6:
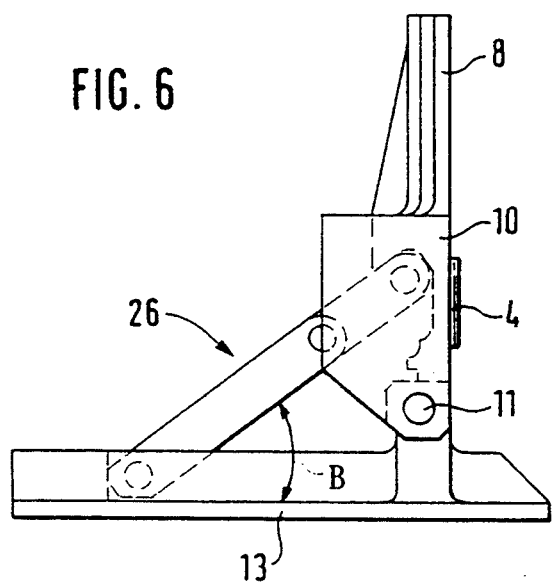
FIG. 6 is a schematic illustration of the present apparatus in its extended position, however, with the latching member omitted, but showing the angular position of the toggle lever relative to the loading floor level.

FIG. 6 shows the extended operational position in which the toggle lever 26 extends at an angle B relative to the horizontal. The angle B is preferably within the range of about 30° to 60°.

Although the invention has been described with reference to specific example embodiments, it will be appreciated that it is intended to cover all modifications and equivalents within the scope of the appended claims.

What we claim is:

1. An apparatus for guiding a piece of freight on a loading floor within a cargo hold of an aircraft, comprising guide means (1, 2) for laterally aligning and restraining said piece of freight, carrier means (10) for mounting said guide means to said loading floor, hinging means (11) for journalling said carrier means (10) to said loading floor of said aircraft, and latching means (15) having a cantilevered section for guiding and restraining said piece of freight in a vertical direction, and toggle lever means (26) for tilting said carrier means (10) into a recessed position in said loading floor, said toggle lever means (26) being arranged between said carrier means and a fixed point (30) in said loading floor, said latching means comprising a cantilevered guide finger (15) extending substantially horizontally and substantially perpendicularly to said guide means when said guide means are in an upright operative position, said cantilevered guide finger (15) of said latching means being mounted for rotation about an axis (16) for recessing said guide finger into said loading floor below a plane defined by said loading floor, said apparatus further comprising cam means (17, 18, 34) for rotating said guide finger (15) about said axis (16) into a recessed position, said cam means being operated by a tilting movement of said guide means into said recessed position, wherein said cam means comprise a cam surface (17) as part of said latching means and a further cam member (18, 34) secured to said loading floor, said cam member and said cam surface engaging each other in response to a tilting operation.

2. The apparatus of claim 1, further comprising a mounting shoe (13) secured to carrier rails in said loading floor, said hinging means (11) and said fixed point (30) being arranged on said mounting shoe, and means for securing said mounting shoe to said loading floor.

3. The apparatus of claim 1, wherein said toggle lever means (26) in its extended position assumes an angle within the range of 30° to 60° to the horizontal of said loading floor, and means (27A and/or 10A) for arresting said toggle lever means in a stretched out position in which said toggle lever means (26) lock said guide means (1, 2) and said latching means in an operative position.

4. The apparatus of claim 2, further comprising a guide roller (23) with a horizontal journal axis (23A) mounted to said mounting shoe, said guide roller (23) projecting above a plane defined by said loading floor for guiding said piece of freight as it is moving on said loading floor.

5. The apparatus of claim 1, wherein said guide means comprise a plurality of tiltable first guide elements (1) and a plurality of second guide elements (2), and an interlocking device (7) interconnecting neighboring first and second guide elements (1,2) in a tiltable manner.

6. The apparatus of claim 1, further comprising at least one reset spring connected to said tiltable guide means for facilitating the restoring of said guide means into an upright, operative position.

7. The apparatus of claim 3, wherein said means for arresting said toggle lever means comprise a normally fixed stop (33A) which is adjustable in its stop position.

8. The apparatus of claim 1, wherein said cam means (17,34) rotate said latching finger or member through an angle of about 90° while said latching means are tilting into a recessed inoperative position in said loading floor.

9. The apparatus of claim 1, wherein said cam member is secured to said loading floor by being mounted directly on said loading floor.

10. The apparatus of claim 2, wherein said cam member is secured to said loading floor by being mounted on said mounting shoe.

11. An apparatus for guiding a piece of freight on a loading floor within a cargo hold of an aircraft, comprising guide means (1, 2) for laterally aligning and restraining said piece of freight, carrier means (10) for mounting said guide means to said loading floor, hinging means (11) for journalling said carrier means (10) to said loading floor of said aircraft, and latching means (15) having a cantilevered section for guiding and restraining said piece of freight in a vertical direction, and toggle lever means (26) for tilting said carrier means (10) into a recessed position in said loading floor, said toggle lever means (26) being arranged between said carrier means and a fixed point (30) in said loading floor, said apparatus further comprising a mounting shoe (13) secured to carrier rails in said loading floor, said hinging means (11) and said fixed point (30) being arranged on said mounting shoe, means for securing said mounting shoe to said loading floor, and a guide roller (23) with a horizontal journal axis (23A) mounted to said mounting shoe, said guide roller (23) projecting above a plane defined by said loading floor for guiding said piece of freight as it is moving on said loading floor.

12. An apparatus for guiding a piece of freight on a loading floor within a cargo hold of an aircraft, comprising guide means (1, 2) for laterally aligning and restraining said piece of freight, carrier means (10) for mounting said guide means to said loading floor, hinging means (11) for journalling said carrier means (10) to said loading floor of said aircraft, and latching means (15) having a cantilevered section for guiding and restraining said piece of freight in a vertical direction, and toggle lever means (26) for tilting said carrier means (10) into a recessed position in said loading floor, said toggle lever means (26) being arranged between said carrier means and a fixed point (30) in said loading floor, wherein said guide means comprise a plurality of tiltable first guide elements (1) and a plurality of second guide elements (2), and an interlocking device (7) interconnecting neighboring first and second guide elements (1, 2) in a tiltable manner.

* * * * *